United States Patent [19]

Ito

[11] Patent Number: 5,737,101
[45] Date of Patent: Apr. 7, 1998

[54] INTERPOLATING OPERATION METHOD AND APPARATUS FOR IMAGE SIGNALS

[75] Inventor: Wataru Ito, Kanagawa-ken, Japan

[73] Assignee: Fuji Photo Film., Ltd., Kanagawa, Japan

[21] Appl. No.: 686,030

[22] Filed: Jul. 25, 1996

[30] Foreign Application Priority Data

Aug. 9, 1995 [JP] Japan ................................. 7-203207

[51] Int. Cl.⁶ ............................... H04N 1/46; H04N 1/41
[52] U.S. Cl. ...................... 358/525; 382/300; 358/525; 358/428
[58] Field of Search ............................ 382/300, 252, 382/253; 358/525, 428

[56] References Cited

U.S. PATENT DOCUMENTS

| 5,054,100 | 10/1991 | Tai | 382/47 |
|---|---|---|---|
| 5,131,057 | 7/1992 | Walowit et al. | 382/300 |
| 5,294,998 | 3/1994 | Piovoso et al. | 382/300 |
| 5,418,899 | 5/1995 | Aoki et al. | 395/139 |

OTHER PUBLICATIONS

"Conversion of Image Resolutions for High Quality Visual Communication"; Mruetusatorn et al., IEICE Transactions on Information and Systems; vol. E76–D, No. 2, Feb. 1993, pp. 251–257.

"An Edge–Restricted Spatial Interpolation Algorithm"; Xue et al.; Journal of Electronic Imaging, Apr. 1992, vol. 1, No. 2, pp. 152–161.

"Signal Processing IV: Theories and Applications—Edge Preserved Image Zooming"; Wang et al., Proceedings of EUSIPCO–88, Fourth European Signal Processing Conference Grenoble, France, pp. 1445–1448.

*Primary Examiner*—Edward L. Coles, Sr.
*Assistant Examiner*—Twyler M. Lamb
*Attorney, Agent, or Firm*—Sughrue, Mion, Zinn, Macpeak & Seas, PLLC

[57] ABSTRACT

An interpolating operation is carried out on original image signal components which make up an original image signal representing an original image and represent values of original picture elements arranged in a grid pattern at predetermined intervals to obtain interpolation image signal components representing values of interpolation picture elements arranged in a grid pattern at intervals different from those of the original picture elements. Each interpolation image signal component is operated by multiplying the image signal components for a plurality of original picture elements adjacent to the interpolation picture element by respective interpolation coefficients calculated from the image signal components for the adjacent original picture elements. The density vector at the interpolation picture element on the original image represented is calculated, distances of the respective adjacent original picture elements from a segment perpendicular to the density vector are calculated, the interpolation coefficient is corrected to be smaller as the density vector and/or the distance of the original picture element from the segment becomes larger, and the interpolating operation is carried out on the basis of the corrected interpolation coefficient.

2 Claims, 8 Drawing Sheets

INTERPOLATING OPERATION METHOD AND APPARATUS FOR IMAGE SIGNALS

BACKGROUND OF THE INVENTION

1. Field of the Invention

This invention relates to an interpolating operation method and apparatus for an image signal, and more particularly to an interpolating operation method and apparatus for an image signal applied at least to a portion of an image where an edge portion, in which change in density is sharp, extends obliquely.

2. Description of the Related Art

Techniques for photoelectrically reading out an image, which has been recorded on a radiation photographic film, in order to obtain an image signal, carrying out appropriate image processing on the image signal, and then reproducing a visible image by use of the processed image signal have heretofore been known in various fields. For example, there has been put into practice a technique of reproducing a high quality image excellent in contrast, sharpness, graininess and the like by recording an X-ray image on X-ray film having a low γ value designed to conform to subsequent image processing, photoelectrically reading out the X-ray image from the X-ray film, thereby obtaining an image signal, carrying out image processing on the image signal and reproducing a visible image as a photograph or the like by use of the processed image signal. See Japanese Patent Publication No. 61(1986)-5193.

When certain kinds of phosphors are exposed to radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor". It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device such as a cathode ray tube (CRT) display device. See Japanese Unexamined Patent Publication No. 56(1981)-11395, U.S. Pat. Nos. 4,528,264, 4,315,318, 4,387,428, 4,276,473, and the like. Radiation image recording and reproducing systems, which use stimulable phosphor sheets, have been put into practice and are advantageous over conventional radiography using silver halide photographic materials, in that images can be recorded even when the energy intensity of the radiation, to which the stimulable phosphor sheet is exposed, varies over a wide range.

In image recording and reproducing systems, in which an image signal is obtained in the manner described above and a visible image is reproduced from the image signal, in cases where the region of interest in the visible image is to be viewed in more detail, the region of interest is often enlarged and reproduced. Such an enlarged image can be obtained by carrying out a predetermined interpolating operation on the original image signal, which has been obtained by reading out an original image, forming an interpolation image signal, which is a secondary image signal and is made up of a number of image signal components different from that of the original image signal, and reproducing a visible image from the interpolation image signal.

In view of easiness to arrange an image input/output system, picture elements are generally arranged in a square grid pattern. In such a system, interpolated image signal components are obtained by carrying out linear interpolation on original image signal components of four original picture elements around each of points at which additional picture elements are to be set (interpolation points).

For example, in FIG. 8A, ⓧ denotes of original picture elements P arranged in a square grid pattern and x denotes each of interpolation points P' which are arranged in a square grid pattern finer than that of original picture elements. The interpolated image signal component corresponding, for instance, to interpolation point P'0 can be obtained in the following manner.

The image signal components $S_A$, $S_B$, $S_C$ and $S_D$ of four original picture elements $P_A$, $P_B$, $P_C$ and $P_D$ around the interpolation point P'0 are used.

Assuming that the interval of each of sections $P_A$–$P_B$, $P_C$–$P_D$, $P_A$–$P_C$ and $P_B$–$P_D$ is equal to 1, the distance of the interpolation point P'0 from the original picture element $P_A(P_C)$ as measured in the direction of x-axis (in the transverse direction) is Tx and the distance of the interpolation point P'0 from the original picture element $P_A(P_B)$ as measured in the direction of y-axis (in the longitudinal direction) is Ty as shown in FIG. 8B, interpolation image signal components S'm and S'n for interpolation points P'm and P'n aligned with the interpolation point P'0 in the direction of y-axis are first obtained by linear interpolation according to the following Formulas (17) and (18).

$$S'm = (1-Tx)S_A + TxS_B \tag{17}$$

$$S'n = (1-Tx)S_C + TxS_D \tag{18}$$

Then with respect to the direction of y-axis, linear interpolating operation is carried out according to the following Formula (19) including the interpolation image signal components S'm and S'n, thereby obtaining interpolation image signal component S'0 for the interpolation point P'0.

$$S'0 = (1-Ty)S'm + TyS'n \tag{19}$$

The operations described above are repeated for the other interpolation points P' in order to obtain interpolation image signal components S' for the interpolation points P'.

As the interpolating operation methods for an image signal, there have been proposed various methods other than the linear interpolation described above, e.g., a method using a second- or third-order spline interpolating function. For example, in a cubic spline interpolating operation using a third-order spline interpolating function, it is necessary that the spline interpolating function passes through the original sampling points (pictures elements) and that the first-order differential coefficient of the spline interpolating function is continuous between adjacent sections. Under these conditions, interpolation coefficients by which the original imagine signal components for four picture elements around the interpolation point multiplied are calculated and the interpolation image signal component for the interpolation point is obtained by multiplying the original image signal components for four picture elements around the interpolation point by the interpolation coefficients. The cubic spline interpolating operation provide a secondary imagine (interpolation image) having a relatively high sharpness. As an interpolating operation method for obtaining an interpolation image signal for reproducing a secondary image which has a relatively low sharpness and is smooth, a B spline interpolating operation is known. Thus, when a second image having a high sharpness is to be reproduced, the cubic spline interpolating operation may be used while when a secondary image which is smooth and has a relatively low sharpness is to be reproduced, the B spline interpolating operation may be used.

A reproduced visible image sometimes includes an edge portion where change in density (brightness) is sharp, e.g., bone in a radiation image and such an edge portion is sometimes enlarged.

When such an edge portion extends obliquely with respect to the square grid pattern of the original picture elements and the linear interpolating operation according to said Formulas (16) to (18), the cubic spline interpolating operation or the B spline interpolating operation is carried out on the original image signal, the enlarged image of the oblique edge portion becomes remarkably zigzag.

For example, in an image having an oblique edge portion as shown in FIG. 9A, microscopically the oblique edge portion is a boundary between a region of higher density points (indicated at black dots) and lower density points (indicated at white dots) as shown in FIG. 9B. When interpolation image signal components are obtained by carrying out said interpolating operation on the edge portion, the obtained interpolation image signal component S'0 becomes an image signal representing an intermediate density slightly lower than that of the higher density picture elements $P_A$, $P_B$ and $P_C$ as shown in FIG. 10B since the interpolation image signal component S'0 depends also on the original image signal component $S_D$ representing a lower density. Accordingly, when an enlarged image is reproduced from the interpolation image signal thus obtained, the zigzag line at the edge portion is enlarged as it is as shown by the broken line in FIG. 10B. Thus the edge portion which substantially looks like an oblique straight line in the whole image as shown in FIG. 9A clearly appears zigzag in the enlarged image as shown in FIG. 10A.

Such zigzag in the edge portion is obstructive in diagnostic observation and deteriorates diagnostic performances of the image.

SUMMARY OF THE INVENTION

In view of the foregoing observations and description, the primary object of the present invention is to provide an interpolating operation method and apparatus for an image signal which can provide an enlarged image in which an oblique edge portion can be reproduced as a smooth and sharp image.

In accordance with the present invention, an interpolating operation is carried out on original image signal components which make up an original image signal representing an original image and represent values of original picture elements arranged in a grid pattern at predetermined intervals in vertical and horizontal directions to obtain interpolation image signal components representing values of interpolation picture elements arranged in a grid pattern at intervals different from those of the original picture elements. In the interpolating operation, the interpolation image signal component for each of the interpolation picture elements is operated by multiplying the image signal components for a plurality of adjacent original picture elements adjacent to the interpolation picture element by respective interpolation coefficients which are calculated from the image signal components for the adjacent original picture elements. The density vector at the interpolation picture element on the original image represented by the original image signal is calculated, distances of the respective adjacent original picture elements from a straight segment perpendicular to the density vector are calculated, the interpolation coefficient for each of the adjacent original picture elements is corrected to be smaller as the density vector and/or the distance of the original picture element from the straight segment perpendicular to the density vector becomes larger, and then the interpolating operation is carried out on the basis of the corrected interpolation coefficient.

Specifically the adjacent original picture elements are a plurality of (e.g., four) original picture elements nearest to the interpolation picture element.

The interpolation coefficient may be represented by various functions including linear, third-order or higher functions.

Since the density vector in the original image becomes larger in a portion where change in density is larger, when the density vector is relatively large, the segment perpendicular to the density vector represents an edge portion where change in density is sharp in the image. When considering the magnitude of the density vector at the interpolation picture element and the distance between the segment perpendicular to the density vector and the original picture element adjacent to the interpolation picture element, it may be considered that the interpolation picture element is on a edge portion and the segment perpendicular to the density vector represents the edge when the density vector is large. Accordingly, when the interpolation coefficient for the original image signal component for an original picture element distant from the segment is used as calculated, the interpolation image signal component is affected by a picture element with a density different from that of the edge in case where the edge portion extends obliquely to the pattern of the picture elements, which results in an interpolation image signal component representing a density different from that of the edge. Accordingly, when an image is reproduced from an interpolation image signal made up of interpolation image signal components thus obtained, the reproduced image has an oblique edge portion contoured by an enlarged zigzag line.

Accordingly, in accordance with the present invention, the interpolation coefficient calculated is not applied as calculated but applied after corrected according to the magnitude of the density vector at the interpolation picture element and/or the distance of the interpolation picture element from the segment perpendicular to the density vector. That is, the interpolation coefficient is corrected to be smaller as the density vector becomes larger and/or the distance from the segment perpendicular to the density vector increases. Accordingly when an edge portion extends obliquely, the interpolation image signal component for an interpolation picture element on the edge portion less depends upon the image signal components for picture elements distant from the edge as compared with those for picture elements near the edge, or picture elements disposed along the edge. Accordingly the interpolation picture elements on the edge portion are given substantially the same density as the edge portion and the zigzag on the edge portion in the original image is not enlarged in the interpolation image, whereby the oblique edge portion in the enlarged image can have a smooth contour.

The density vector at an interpolation picture element in a portion other than an edge portion is relatively small and accordingly the interpolation coefficient is not corrected so largely even if the original picture element is relatively distant from the segment perpendicular to the density vector, whereby the interpolation image signal component is calculated with the interpolation coefficient substantially unchanged.

When edge portions have been distinguished from other portions by some suitable method, the interpolation coefficient may be corrected solely on the basis of the distance from the segment perpendicular to the density vector without taking into account the magnitude of the density vector.

DESCRIPTION OF THE PREFERRED EMBODIMENT

Figure 1:
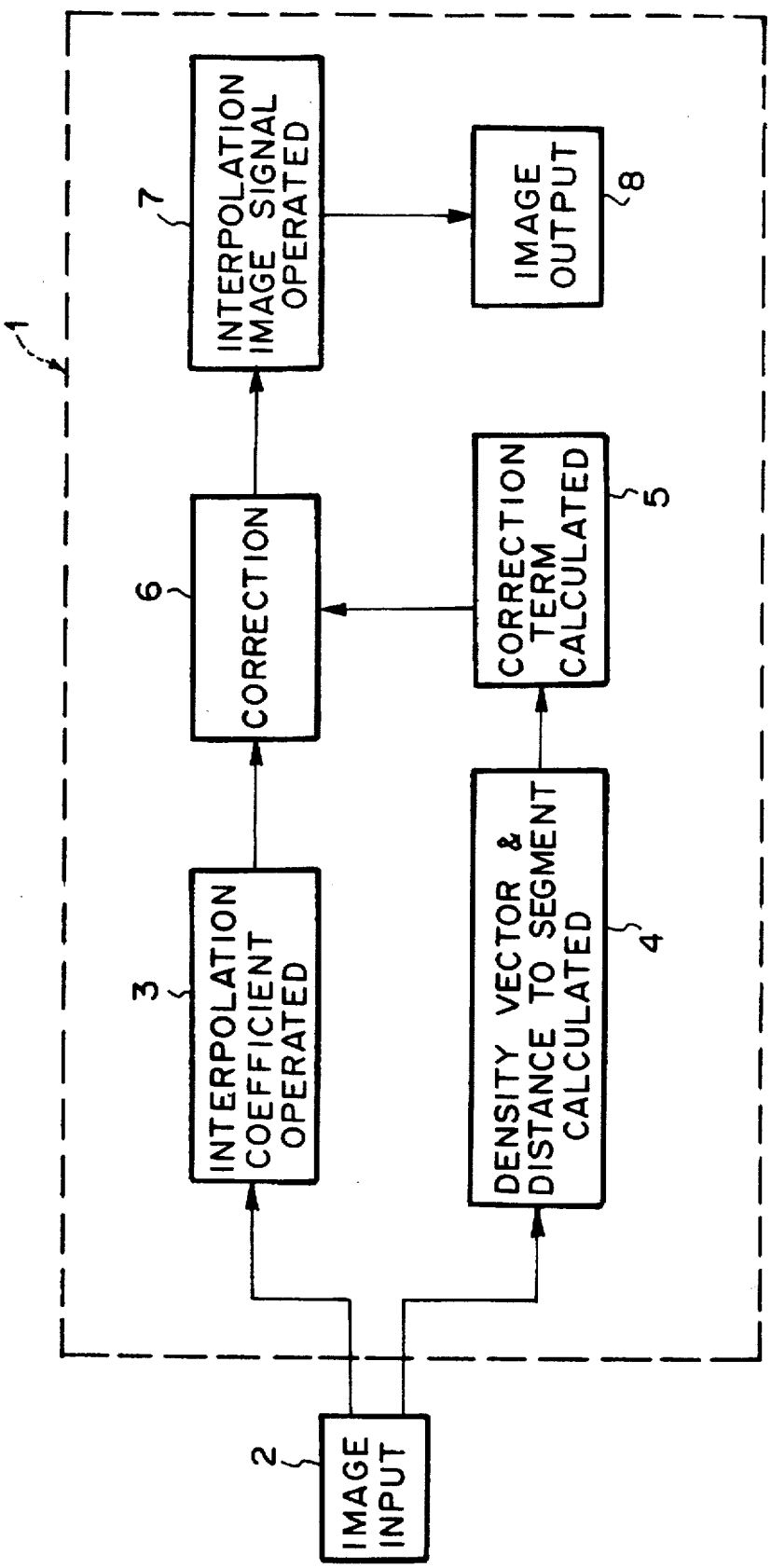
FIG. 1 is a schematic block diagram showing an interpolating operation apparatus in accordance with an embodiment of the present invention.

In FIG. 1, an interpolating operation apparatus 1 in accordance with an embodiment of the present invention comprises an interpolation coefficient operation means 3 which calculates interpolation coefficients at interpolation picture elements on the basis of original image signal components input from an image input means 2, a vector/distance calculating means 4 which calculates the density vector at each interpolation picture element in the original image and the distance between the segment perpendicular to the density vector and the original picture element used in the interpolation, an correction term calculating means 5 which calculates the correction term for correcting the interpolation coefficient, calculated by the interpolation coefficient operation means 3, on the basis of the magnitude of the density vector and/or the distance between the segment perpendicular to the density vector and the original picture element used in the interpolation calculated by the vector/distance calculating means 4, a correcting means 6 which corrects the interpolation coefficient on the basis of the correction term calculated by the correction term calculating means 5, an interpolation image signal operation means 7 which operates interpolation image signal components on the basis of the interpolation coefficients corrected by the correcting means 6 and operates an interpolation image signal made up of the interpolation image signal components and an image output means 8 for reproducing a visible image from the interpolation image signal operated by the interpolation image signal operation means 7.

Figure 2:
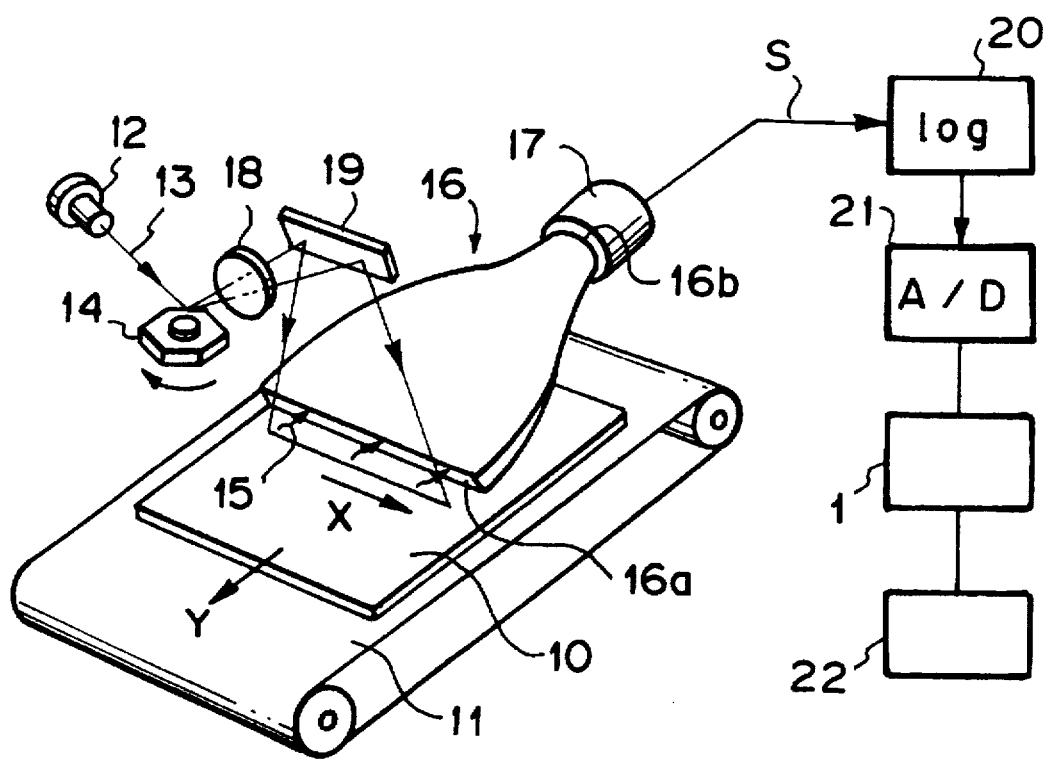
FIG. 2 is a perspective view showing an image read-out apparatus.

The image input means 2 may be, for instance, a radiation image read-out apparatus shown in FIG. 2. Specifically, with the image read-out apparatus illustrated in FIG. 2, an X-ray image of an object, which has been stored on a stimulable phosphor sheet 10, is read from the stimulable phosphor sheet 10. The stimulable phosphor sheet 10 has been exposed to radiation such as X-rays through an object such as a human body and transmission radiation image information has been stored on the stimulable phosphor sheet 10. The stimulable phosphor sheet is conveyed in a sub-scanning direction, which is indicated by the arrow Y, by a conveyor means 11 such as an endless belt. A laser beam 13, which serves as stimulating rays (read-out rays), is emitted from a laser 12 such as a semiconductor laser. The laser beam 13 is reflected and deflected by a rotating polygon mirror 14 which is quickly rotated. The laser beam 13 then passes through a scanning lens 18, which may be generally constituted of an fθ lens. The direction of the optical path of the laser beam 13 is then changed by a mirror 19, and the laser beam 13 impinges upon the stimulable phosphor sheet 10 and scans it in a main scanning direction indicated by the arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17.

The light guide member 16 is made of a light guiding material, such as an acrylic plate. The light guide member 16 has a linear light input face 16a, which is positioned to extend along the main scanning line on the stimulable phosphor sheet 10, and a ring-shaped light output face 16b, which is positioned in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image is converted into an electric signal by the photomultiplier 17.

An analog output signal S output from the photomultiplier 17 is logarithmically amplified by a logarithmic amplifier 20, and digitized by an analog-to-digital converter 21 at a predetermined reading scale factor. In this manner, an digital original image signal bearing thereon a two-dimensional image is obtained and is input into the aforesaid interpolating operation apparatus 1.

In the interpolating operation apparatus 1, interpolation coefficients are first calculated by the interpolation coefficient operation means 3. Calculation of the interpolation coefficient will be described, hereinbelow. In this particular embodiment, the interpolation coefficient is calculated by a third-order cubic spline interpolating operation. Though the original picture elements are arranged in a square grid pattern in this embodiment, the original picture elements are assumed here to be linearly arranged for the purpose of simplicity of description.

Figure 3:
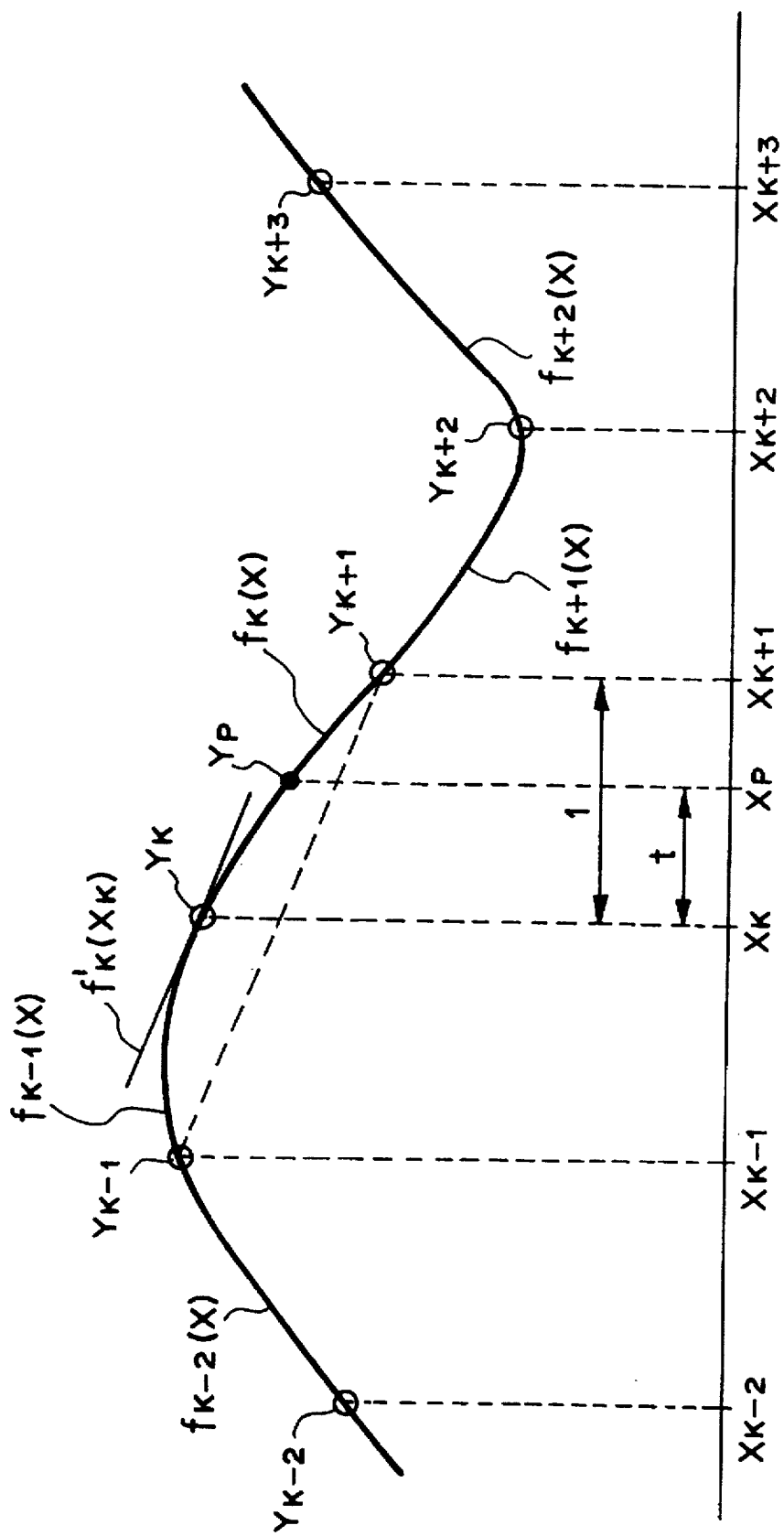
FIG. 3 is an explanatory graph showing how interpolation image signal components are obtained from original image signal components, which are sampled with a period of an equal interval and represent sampling points (picture elements) arrayed in one direction.

As illustrated in FIG. 3, the original image signal components, which have been detected as digital signal components from an original image and represent a series of picture elements $X_{k-2}$, $X_{k-1}$, $X_k$, $X_{k+1}$, $X_{k+2}$, ..., are respectively represented by $Y_{k-2}$, $Y_{k-1}$, $Y_k$, $Y_{k+1}$, $Y_{k+2}$, ... A third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

How the interpolating operation is carried out when a point taken for interpolation (hereinbelow referred to as "the interpolation point") $X_p$ falls within the section $X_k \sim X_{k+1}$ will be described hereinbelow. The spline interpolating function $f_k$ corresponding to the section $X_k \sim X_{k+1}$ is represented by Formula (1).

$$f_k(X) = A_k X^3 + B_k X^2 + C_k X + D_k \qquad (1)$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (2) to (5) to be satisfied.

$$f_k(X_k) = Y_k \qquad (2)$$

$$f_k(X_{k+1}) = Y_{k+1} \qquad (3)$$

$$f_k'(X_k) = f_{k-1}'(X_k) \qquad (4)$$

$$f_k'(X_{k+1}) = f_{k+1}'(X_{k+1}) \qquad (5)$$

In these formulas, $f_k'$ represents the first-order differentiation $(3A_k x^2 + 2B_k x + C_k)$ of the function $f_k$.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (6) to be satisfied.

$$f_k'(X_k) = (Y_{k+1}-Y_{k-1})/(X_{k+1}-X_{k-1}) \qquad (6)$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (7) to be satisfied.

$$f_k'(X_{k+1}) = (Y_{k+2}-Y_k)/(X_{k+2}-X_k) \qquad (7)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (2) to (7), the formulas shown below obtain.

$$f_k(0) = D_k = Y_k$$

$$f_k(1) = A_k + B_k + C_k + D_k = Y_{k+1}$$

$$f_k'(0) = C_k = (Y_{k+1}-Y_{k-1})/2$$

$$f_k'(1) = 3A_k + 2B_k + C_k = (Y_{k+2}-Y_k)/2$$

Therefore, the formulas shown below obtain.

$$A_k = (Y_{k+2} - 3Y_{k+1} + 3Y_k - Y_{k-1})/2$$

$$B_k = (-Y_{k+2} + 4Y_{k+1} - 5Y_k + 2Y_{k-1})/2$$

$$C_k = (Y_{k+1} - Y_{k-1})/2$$

$$D_k = Y_k$$

As described above, the variable conversion of X=t is carried out, and therefore the spline interpolating function $f_k(X)$ is represented by the formula shown below.

$$f_k(X) = f_k(t)$$

Therefore, an interpolated image signal component $Y_p$ corresponding to the interpolation point $X_p$ may be represented by Formula (8).

$$Y_p = f_k(t) = A_k t^3 + B_k t^2 + C_k t + D_k \qquad (8)$$

Substituting the coefficients $A_k$, $B_k$, $C_k$, and $D_k$ into Formula (8) yields $$Y_p = \{(Y_{k+2} - 3Y_{k+1} + 3Y_k - Y_{k-1})/2\}t^3 +$$
$$\{(-Y_{k+2} + 4Y_{k+1} - 5Y_k + 2Y_{k-1})/2\}t^2 +$$
$$\{(Y_{k+1} - Y_{k-1})/2\}t + Y_k$$

Arranging this formula with respect to the image signal components $Y_{k-1}$, $Y_k$, $Y_{k+1}$, and $Y_{k+2}$ yields Formula (9).

$$Y_p = \{(-t^3 + 2t^2 - t)/2\}Y_{k-1} + \qquad (9)$$
$$\{(3t^3 - 5t^2 + 2)/2\}Y_k +$$
$$\{(-3t^3 + 4t^2 + t)/2\}Y_{k+1} +$$
$$\{(t^3 - t^2)/2\}Y_{k+2}$$

The coefficients for the original image signal components $Y_{k-1}$, $Y_k$, $Y_{k+1}$, and $Y_{k+2}$ are referred to as the interpolation coefficients $a_{k-1}$, $a_k$, $a_{k+1}$, and $a_{k+2}$. Specifically, the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ in Formula (9), may be represented by the Formulas shown below.

$$a_{k-1} = (-t^3 + 2t^2 - t)/2$$

$$a_k = (3t^3 - 5t^2 + 2)/2$$

$$a_{k+1} = (-3t^3 + 4t^2 + t)/2$$

$$a_{k+2} = (t^3 - t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

Figure 4:
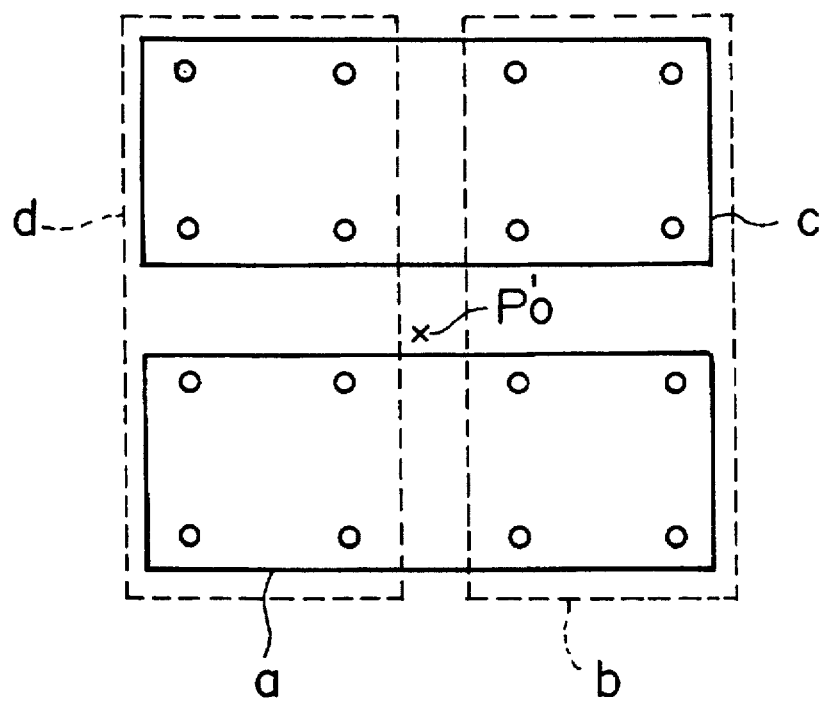
FIG. 4 is a view for illustrating calculation of the density vector.

In the vector/distance calculating means 4, the density vector at the interpolation picture element (interpolation point) and the distance between the segment perpendicular to the density vector and the original picture element represented by the original image signal component used in the interpolating operation are calculated. That is, as shown in FIG. 4, the vector/distance calculating means 4 allocates sixteen picture elements in the vicinity of interpolation picture element P0', whose interpolation image signal component is to be calculated, to four regions a, b, c and d, and calculates the sums Wa, Wb, Wc and Wd of the original image signal components in the respective regions. Then density vector Pv is calculated as follows.

$$Pv=(Wb-Wa, Wd-Wc)$$

Figure 5:
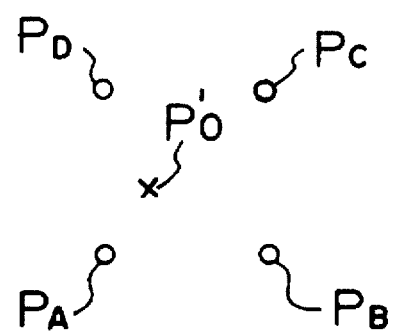
FIG. 5 is another view for illustrating calculation of the density vector.

Alternatively, as shown in FIG. 5, the density vector Pv may be calculated on the basis of the original image signal components Sa, Sb, Sc and Sd of four picture elements Pa, Pb, Pc and Pd around the interpolation picture element $P_0'$, whose interpolation image signal component is to be calculated, according to the following formula.

$$Pv=(Sb-Sa, Sd-Sc)$$

Then the segment lv perpendicular to the density vector Pv is obtained. The interpolation image signal component S0' is calculated by multiplying the original image signal components Sa, Sb, Sc and Sd of the four original picture elements Pa, Pb, Pc and Pd adjacent to the interpolation picture element $P_0'$ by the respective interpolation coefficients, which are corrected according to the magnitude of the density vector Pv and the distances of the original picture elements Pa, Pb, Pc and Pd from the segment lv in accordance with the present invention. The correction is carried out as follows.

Figure 6:
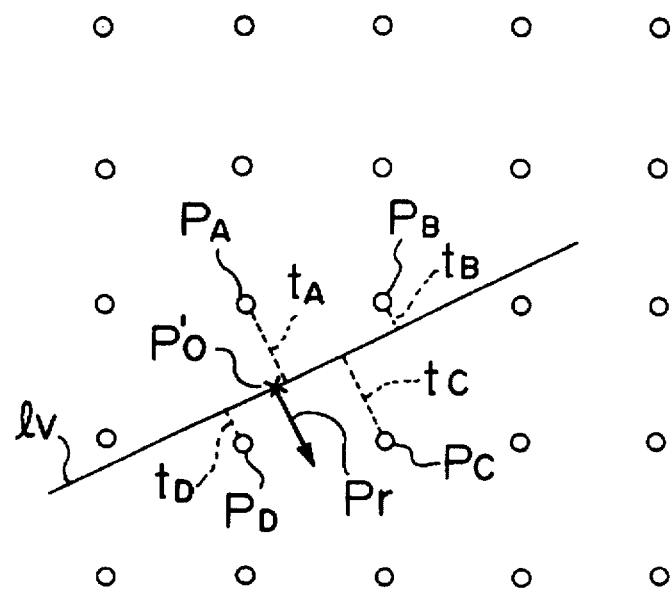
FIG. 6 is a view showing the density vector, the segment perpendicular to the density vector and the distance from the segment.

It is assumed that the co-ordinates of an original picture element shown in FIG. 6 be (u,v), the interpolation coefficient at (u,v) be Au,v , the coordinates of the interpolation picture element P0' by (dx,dy) and the density vector Pv at (u,v) be (Px,Py). The corrected interpolation coefficient Au,v' is obtained from the following Formula (10).

$$A_{u,v}'=A_{u,v}/\{k \cdot f(Pv, t)+1\} \quad (10)$$

wherein k is a constant, f(Pv, t) is the product (correction term) of the density vector Pv and the distance of (u,v) from the segment lv perpendicular to the density vector Pv.

Specifically calculation of Formula (10) is carried out as follows.

That is, in the correcting term calculating means 5, the magnitude |Pv| of the density vector (Px,Py) obtained in the vector/distance calculating means 4 is obtained according to the following Formula (11).

$$|Pv|=\sqrt{(Px^2+Py^2)} \quad (11)$$

Then the distance t between the segment lv, which passes through the interpolation picture element (dx,dy) and extends perpendicular to the density vector Pv, and the original picture element (u,v) is calculated according to the following Formula (12).

$$t=|Px(u-dx)+Py(v-dy)|/\sqrt{(Px^2+Py^2)} \quad (12)$$

Accordingly, the correction term f(Pv, t) is as follows.

$$f(Pv, t)=|Px(u-dx)+Py(v-dy)| \quad (13)$$

In the correcting means 6, the interpolation coefficient calculated in the correction term calculating means 5 is corrected on the basis of the correction term f(Pv, t). That is, by substituting Formula (13) in Formula (10), the following Formula (10') is obtained.

$$A_{u,v}'=A_{u,v}/(k \cdot |Px(u-dx)+Py(v-dy)|+1) \quad (10')$$

This correction of the interpolation coefficient $A_{u,v}$ is carried out on the four original picture elements Pa, Pb, Pc and Pd around the interpolation picture element P0', thereby obtaining four corrected interpolation coefficients $A_{u,v}'$, and final interpolation coefficients $$A_{u,v}'/\Sigma A'_{ij}$$

are obtained by normalizing the corrected interpolation coefficients $A_{u,v}'$.

The final interpolation coefficient thus corrected becomes smaller as the inclination of the density vector Pv at the interpolation picture element P0' becomes larger and the distance of the original picture element from the segment perpendicular to the density vector Pv becomes larger. That is, where the density vector Pv becomes large in the original image is an edge portion where change in density is large and in such case, the segment perpendicular to the density vector Pv corresponds to the edge portion. The present invention is to prevent, when an edge where the density vector Pv is relatively extends obliquely to the square grid pattern of the original picture elements, the edge portion from appearing zigzag in an enlarged image.

Specifically when the density vector Pv is relatively large, using the interpolation coefficient for an original picture element distant from the segment perpendicular to the density vector as calculated results in use of the original image signal component for an original picture element distant from the edge, and the interpolation image signal component S0' obtained is affected by the original picture element different from the edge in density and comes to represent the density different from that of the edge. Accordingly when an enlarged visible image is reproduced from an interpolation image signal made up of a series of interpolation image signal components SO' the fine zigzag in the original image is enlarged to be visible in the enlarged image.

In accordance with the present invention, the interpolation coefficient is therefore not applied to the original image signal component as calculated but applied thereto after corrected so that it becomes smaller as the density vector Pv becomes larger and the distance from the segment lv perpendicular to the density vector Pv becomes larger. Accordingly, when an edge portion extends obliquely, the interpolation image signal component S0' for an interpolation picture element on the edge portion comes to less depend upon the original image signal component for an original picture element distant from the edge as compared with the original image signal component for an original picture element along the edge portion. With this arrangement, interpolation picture elements on the edge portion are interpolated to a density substantially equal to that of the edge portion and the zigzag in the original image is not enlarged, whereby the oblique edge portion can be enlarged without zigzag.

Then in the interpolation image signal operation means 7, the interpolation image signal component So' for the interpolation picture element P0' is calculated on the basis of the final interpolation coefficient according to the aforesaid Formula (9). That is, $$S0'=Aa'·Sa+Ab'·Sb+Ac'·Sc+Ad'·Sd \quad (9')$$

wherein Aa', Ab', Ac' and Ad' represent the corrected interpolation coefficients. This operation is carried out for all the interpolation picture elements.

Then an interpolation image signal made up of a series of the interpolation image signal components S0' thus obtained is input into the image output means 8 such as a CRT and a visible image is reproduced from the interpolation image signal. In the visible image reproduced by the image output means 8, even an oblique edge has a sharp and smooth edge without zigzag.

Figure 7:
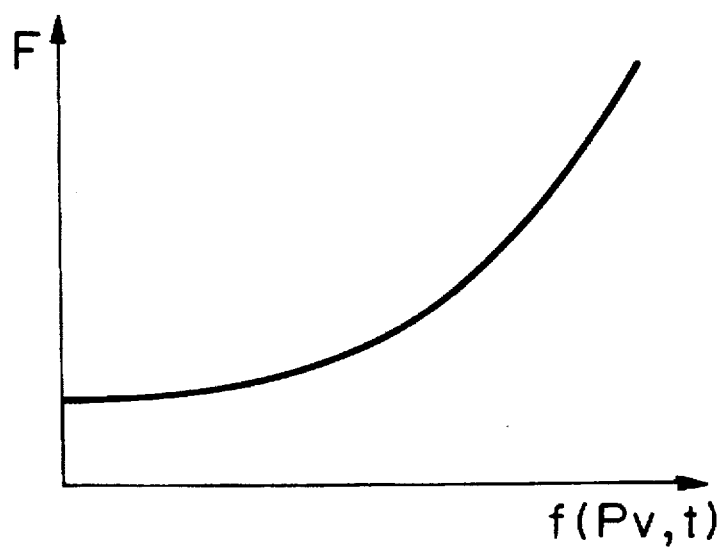
FIG. 7 is a view for illustrating another example of the correction term.
Figure 8A:
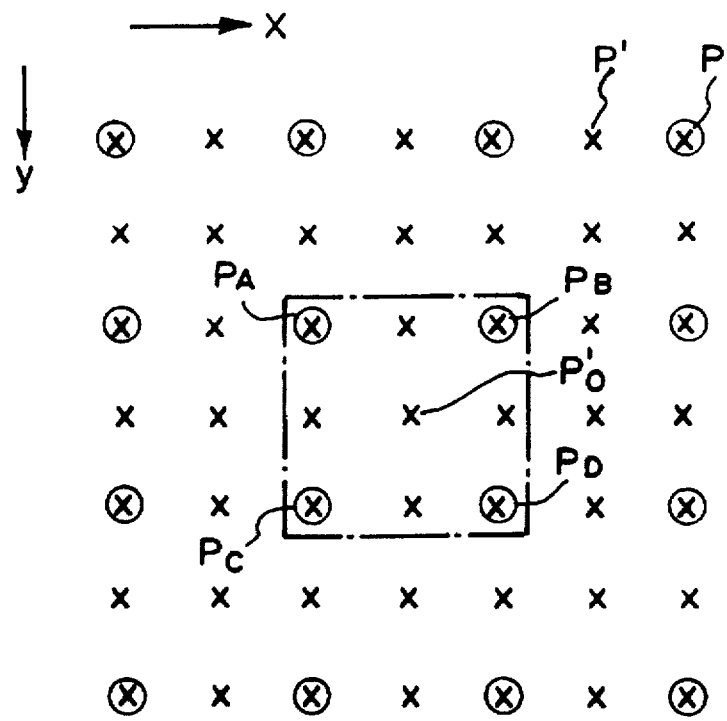
FIG. 8A is a view showing the original picture elements and the interpolation picture elements.
Figure 8B:
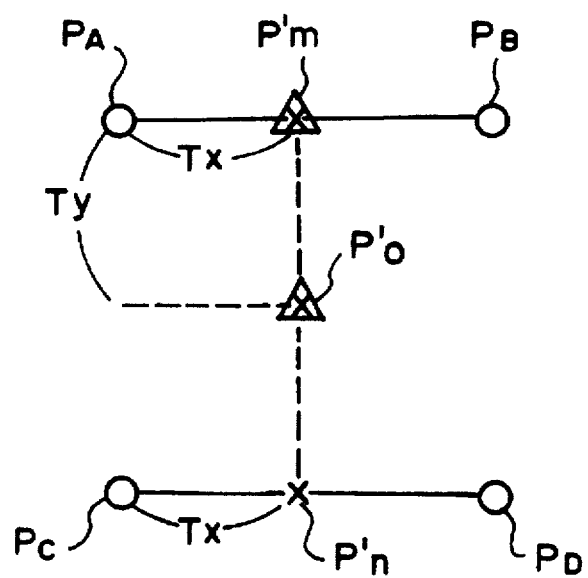
FIG. 8B is an enlarged view of a part of FIG. 8A.
Figure 9A:
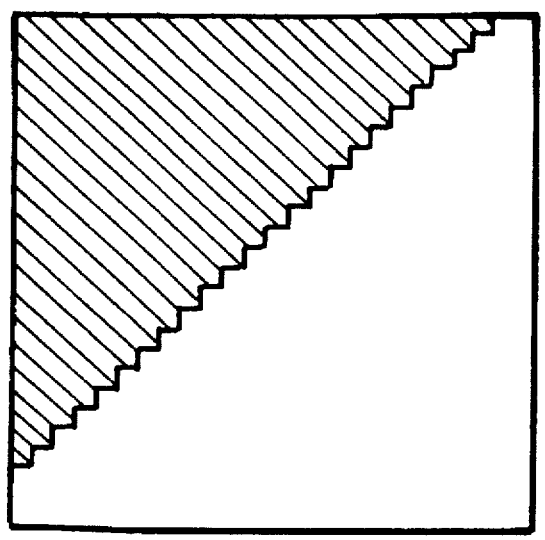
FIG. 9A shows the original image.
Figure 9B:
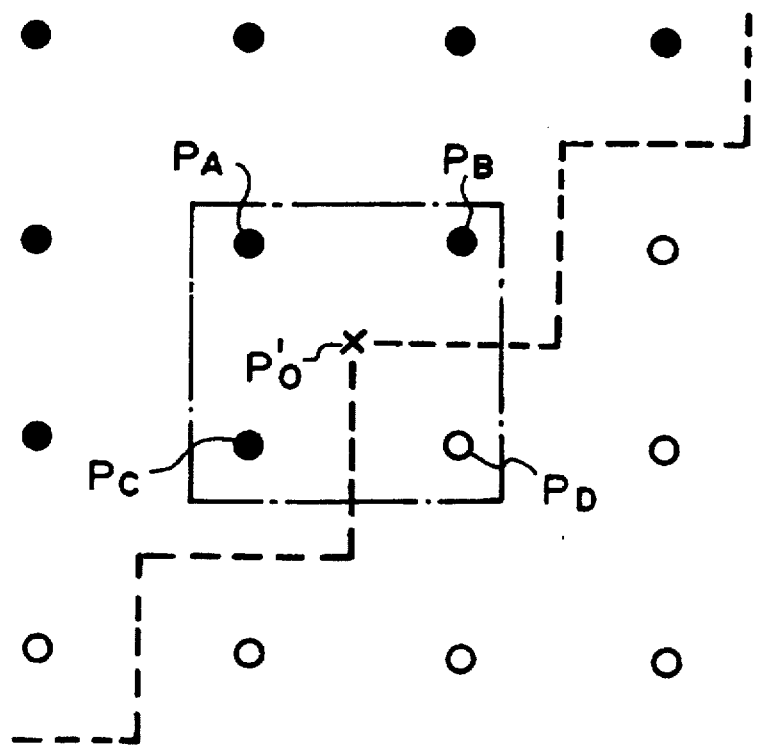
FIG. 9B shows the original picture elements.
Figure 10A:
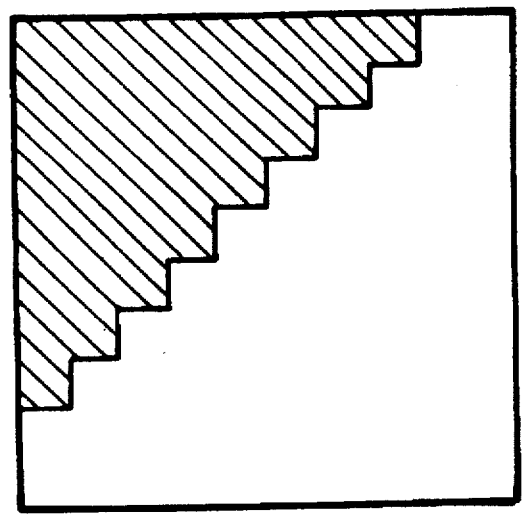
FIG. 10A shows the interpolation image obtained by the conventional method.
Figure 10B:
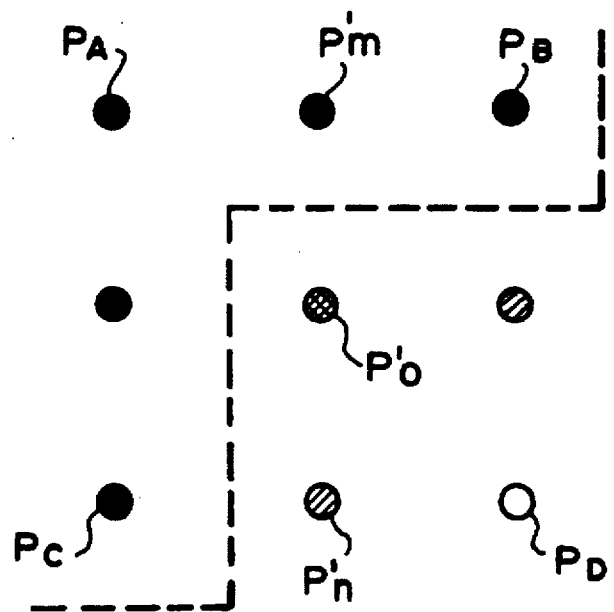
FIG. 10B shows the interpolation picture elements obtained by the conventional method.

Though, in the embodiment described above, the interpolation coefficient is corrected according to Formula (10), the interpolation coefficient may be corrected according to the following Formula (14).

$$A_{u,v}'=A_{u,v}/\{F(Pv, t)\} \quad (14)$$

wherein F(Pv,t) is a function which monotonously increases with increase in f(Pv, t) as shown in FIG. 7.

Further, though, in the embodiment described above, the interpolating operation is carried out on an image detected by a radiation image read-out apparatus such as shown in FIG. 2, the interpolating operation may be carried out on an original image signal which has been stored in a storing means.

Further, though, in the embodiment described above, being carried out by a cubic spline interpolation, the interpolating operation may be carried out, for instance, by a B spline interpolation without being limited to the cubic spline interpolation. Different from the cubic spline interpolation, in the B spline interpolating operation, it is not necessary that the spline interpolating function passes through the original sampling points (picture elements) but it is necessary that the first-order differential coefficient of the spline interpolating function is continuous between adjacent sections. Under the condition, interpolation coefficients $b_{k-1}$, $b_k$, $b_{k+1}$ and $b_{k+2}$ for the original image signal components $Y_{k-1}$, $Y_k$, $Y_{k+1}$ and $Y_{k+2}$ are calculated.

Further the interpolating operation may be carried out on the original image signal by both the B spline interpolation and the cubic spline interpolation. In this case, the interpolation coefficients obtained by the B spline interpolation and the cubic spline interpolation are differently weighted according to a desired scale factor and added to each other. That is, the interpolating operation is carried out according to the following Formula (15) with the value of t varied.

$$F=t·A+(1-t)·B \quad (15)$$

wherein F represents an interpolation image signal component, A represents the interpolation coefficient by the cubic spline interpolation, B represents the interpolation coefficient by the B spline interpolation and t represents the weighting coefficient. For example, when the cubic spline interpolation coefficients for the original image signal components $Y_{k-1}$, $Y_k$, $Y_{k+1}$ and $Y_{k+2}$ are represented by $a_{k-1}$, $a_k$, $a_{k+}$ and $a_{k+2}$ and the B spline interpolation coefficients for the original image signal components $Y_{k-1}$, $Y_k$, $Y_{k+}$ and $Y_{k+2}$ are represented by, $b_k$, $b_{k+}$ and $b_{k+2}$, the interpolation image signal component F is as follows.

$$F = \{t·a_{k-1}+(1-t)·b_{k-1}\}Y_{k-1} + \quad (16)$$
$$\{t·a_k+(1-t)·b_k\}Y_k +$$
$$\{t·a_{k+1}+(1-t)·b_{k+1}\}Y_{k+1} +$$
$$\{t·a_{k+2}+(1-t)·b_{k+2}\}Y_k+2$$

Further, though, in the embodiment described above, the interpolation coefficient is corrected according to both the magnitude of the density vector and the distance of the original picture element from the segment perpendicular to the density vector, the interpolating operation method of the present invention may be applied only to edge portions by separating edge portions from other portions in advance. In such a case, the operation may be simplified by employing a fixed value as the magnitude of the density vector |Pv|.

What is claimed is:

1. A method of an interpolating operation for obtaining an interpolation image signal from an original image signal representing an original image which is carried out on original image signal components which make up the original image signal and respectively represent values of original picture elements arranged in a grid pattern at predetermined intervals in vertical and horizontal directions to obtain interpolation image signal components which make up the interpolation image signal and represent values of interpolation picture elements arranged in a grid pattern at intervals different from those of the original picture elements, the interpolation image signal component for each of the interpolation picture elements being operated by multiplying the image signal components for a plurality of adjacent original picture elements adjacent to the interpolation picture element by respective interpolation coefficients which are calculated from the image signal components for the adjacent original picture elements, wherein the improvement comprising the steps of calculating the density vector at the interpolation picture element on the original image represented by the original image signal, calculating distances of the respective adjacent original picture elements from a straight segment perpendicular to the density vector, correcting the interpolation coefficient for each of the adjacent original picture elements to be smaller as the density vector and/or the distance of the adjacent original picturer element from the straight segment perpendicular to the density vector becomes larger, and carrying out the interpolating operation on the basis of the corrected interpolation coefficient.

2. An interpolating operation apparatus for obtaining an interpolation image signal from an original image signal representing an original image, the original image signal being made up of a series of original image signal components respectively representing values of original picture elements arranged in a grid pattern at predetermined intervals in vertical and horizontal directions, and the interpolation image signal being made up of a series of interpolation image signal components respectively representing values of interpolation picture elements arranged in a grid pattern at intervals different from those of the original picture elements, which apparatus comprising an interpolating operation processing means which operates the interpolation image signal component for each of the interpolation picture elements by multiplying the image signal components for a plurality of adjacent original picture elements adjacent to the interpolation picture element by respective interpolation coefficients which are calculated from the image signal components for the adjacent original picture elements, wherein the improvement comprises that a density vector calculating means calculates the density vector at the interpolation picture element on the original image represented by the original image signal, a distance calculating means calculates distances of the respective adjacent original picture elements from a straight segment perpendicular to the density vector, a correcting means corrects the interpolation coefficient for each of the adjacent original picture elements to be smaller as the density vector and/or the distance of the adjacent original picturer element from the straight segment perpendicular to the density vector becomes larger, and said interpolating operation processing means operates the interpolation image signal component on the basis of the corrected interpolation coefficient.

\* \* \* \* \*